US009089830B2

(12) United States Patent
Marteaux et al.

(10) Patent No.: US 9,089,830 B2
(45) Date of Patent: Jul. 28, 2015

(54) SUSPENSIONS OF SILICATE SHELL MICROCAPSULES FOR TEMPERATURE CONTROLLED RELEASE

(75) Inventors: Leon Andre Marteaux, Auderghem (BE); Brett Lee Zimmerman, Frankenmuth, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/132,653

(22) PCT Filed: Dec. 11, 2009

(86) PCT No.: PCT/US2009/067613
§ 371 (c)(1),
(2), (4) Date: Jun. 3, 2011

(87) PCT Pub. No.: WO2010/077774
PCT Pub. Date: Jul. 8, 2010

(65) Prior Publication Data
US 2011/0236498 A1 Sep. 29, 2011

Related U.S. Application Data

(60) Provisional application No. 61/138,203, filed on Dec. 17, 2008.

(51) Int. Cl.
| A61K 9/16 | (2006.01) |
| A61K 9/50 | (2006.01) |
| A61K 8/00 | (2006.01) |
| A61K 8/18 | (2006.01) |
| A61Q 17/04 | (2006.01) |
| B01J 13/18 | (2006.01) |

(52) U.S. Cl.
CPC ...................................... B01J 13/18 (2013.01)

(58) Field of Classification Search
CPC . A61K 9/5026; A61K 9/5078; A61K 9/1647; A61K 8/35; A61K 8/37; A61Q 17/04; B01J 13/18
USPC .................................................. 424/497, 59
See application file for complete search history.

(56) References Cited

U.S. PATENT DOCUMENTS

| 3,159,601 A | 12/1964 | Ashby |
| 3,220,972 A | 11/1965 | Lamoreaux |
| 3,296,291 A | 1/1967 | Chalk et al. |
| 3,419,593 A | 12/1968 | Willing |
| 3,515,946 A | 6/1970 | Wachtenheim |
| 3,814,730 A | 6/1974 | Karstedt |
| 3,839,220 A | 10/1974 | Barchas |
| 3,928,629 A | 12/1975 | Chandra et al. |
| 3,989,668 A | 11/1976 | Lee et al. |
| 4,528,354 A | 7/1985 | McDougal |
| 4,784,879 A * | 11/1988 | Lee et al. .................. 427/213.34 |
| 5,035,832 A | 7/1991 | Takamura et al. |
| 5,036,117 A | 7/1991 | Chung et al. |
| 5,112,688 A | 5/1992 | Michael |
| 5,175,325 A | 12/1992 | Brown et al. |
| 5,536,756 A | 7/1996 | Kida et al. |
| 5,585,412 A | 12/1996 | Natoli et al. |
| 6,514,439 B2 | 2/2003 | Van Koppenhagen et al. |
| 6,544,540 B2 | 4/2003 | Van Koppenhagen et al. |
| 6,610,108 B2 | 8/2003 | Perry et al. |
| 6,638,984 B2 * | 10/2003 | Soane et al. ..................... 521/56 |
| 2002/0064541 A1 | 5/2002 | Lapidot et al. |
| 2002/0068169 A1 | 6/2002 | Van Koppenhagen et al. |
| 2003/0049214 A1 * | 3/2003 | Muller ............................ 424/59 |
| 2004/0079260 A1 | 4/2004 | Datta et al. |
| 2004/0080063 A1 | 4/2004 | Datta et al. |
| 2004/0081827 A1 | 4/2004 | Datta et al. |
| 2004/0097398 A1 | 5/2004 | Heltovics et al. |
| 2004/0161384 A1 | 8/2004 | Wheatley et al. |
| 2005/0016675 A1 | 1/2005 | Bain et al. |
| 2006/0106156 A1 * | 5/2006 | Woerner ....................... 524/588 |
| 2008/0254077 A1 | 10/2008 | Prigent |
| 2009/0252809 A1 * | 10/2009 | Galeone et al. ............... 424/497 |
| 2011/0158923 A1 * | 6/2011 | Galeone et al. ................. 424/59 |

FOREIGN PATENT DOCUMENTS

| CN | 1101387 A | 4/1995 |
| CN | 1781991 A | 6/2006 |
| EP | 1203578 | 5/2002 |
| EP | 1203578 A1 | 5/2002 |

(Continued)

OTHER PUBLICATIONS

English language abstract and machine-assisted translation for CN 1101387 extracted from the espacenet.com database on May 23, 2013, 29 pages.

English language abstract not available for CN 1781991; however, see English language equivalent US 2006/0106156. Original document extracted from the espacenet.com database on May 23, 2013, 23 pages.

English language abstract and machine-assisted translation for JP 06259017 extracted from the PAJ database on May 22, 2013, 35 pages.

English language abstract for WO 03030878 extracted from espacenet.com database on May 23, 2013, 33 pages. Also see English language equivalents US 2004/234601 and US 2005/037077 for complete document translation.

(Continued)

Primary Examiner — Anoop Singh
Assistant Examiner — Doan Phan
(74) Attorney, Agent, or Firm — Baltazar Gomez

(57) ABSTRACT

Aqueous suspensions of silicate shell microcapsules are disclosed having a core containing a burst aid wherein the silicate shell microcapsules are obtained by; I) mixing an oil phase containing a burst aid and an aqueous solution of a cationic surfactant to form an oil in water emulsion, II) adding a water reactive silicon compound comprising a tetraalkoxysilane to the oil in water emulsion, III) polymerizing the tetraalkoxysilane at the oil/water interface of the emulsion to form a microcapsule having a core containing the oil and a silicate shell.

25 Claims, No Drawings

(56) References Cited

FOREIGN PATENT DOCUMENTS

| | | |
|---|---|---|
| EP | 1100327 | 3/2003 |
| EP | 1100327 B1 | 3/2003 |
| EP | 1100326 | 4/2003 |
| EP | 1100326 B1 | 4/2003 |
| EP | 1185594 | 3/2005 |
| EP | 1185594 B1 | 3/2005 |
| EP | 1 471 995 B1 | 7/2008 |
| EP | 1077686 | 8/2008 |
| EP | 1077686 B1 | 8/2008 |
| JP | 64022806 A | 1/1989 |
| JP | H03202142 A | 9/1991 |
| JP | H 05-285376 A | 11/1993 |
| JP | 06259017 A | 9/1994 |
| JP | 1994259017 | 9/1994 |
| JP | 2005526025 A | 9/2005 |
| JP | 2008-253983 A | 10/2008 |
| WO | 9002655 | 3/1990 |
| WO | WO 9002655 A1 | 3/1990 |
| WO | 0236089 | 5/2002 |
| WO | WO 0236089 A2 | 5/2002 |
| WO | 02078611 | 10/2002 |
| WO | WO 02078611 A2 | 10/2002 |
| WO | 03030878 | 4/2003 |
| WO | WO 03030878 A2 | 4/2003 |
| WO | 03034979 | 5/2003 |
| WO | WO 03034979 A2 | 5/2003 |
| WO | 03066209 | 8/2003 |
| WO | WO 03066209 A1 | 8/2003 |
| WO | 2004018090 | 3/2004 |
| WO | WO 2004018090 A1 | 3/2004 |
| WO | WO2005030383 | 4/2005 |
| WO | WO 2005030383 A1 | 4/2005 |
| WO | WO 2008002637 A2 * | 1/2008 |

OTHER PUBLICATIONS

International Search Report for Application No. PCT/US2009/067613 dated Mar. 8, 2010, 6 pages.

English language abstract for JPH 05-285376 extracted from espacenet.com database on Jun. 26, 2014, 1 pages.

English language abstract for JP 2008-253983 extracted from espacenet.com database on Jun. 26, 2014, 2 pages.

* cited by examiner ord # SUSPENSIONS OF SILICATE SHELL MICROCAPSULES FOR TEMPERATURE CONTROLLED RELEASE

CROSS REFERENCE TO RELATED APPLICATIONS

This application is a U.S. national stage filing under 35 U.S.C. §371 of PCT Application No. PCT/US09/67613 filed on 11 Dec. 2009, currently pending, which claims the benefit of U.S. Provisional Patent Application No. 61/138203 filed 17 Dec. 2008 under 35 U.S.C. §119 (e). PCT Application No. PCT/US09/67613 and U.S. Provisional Patent Application No. 61/138203 are hereby incorporated by reference.

TECHNICAL FIELD

This disclosure relates to aqueous suspensions of silicate shell microcapsules having a core containing a burst aid.

BACKGROUND

Encapsulation techniques based on silicate shell having an organic core are known. For example, WO-A-03/066209 describes an encapsulation process by ex-situ emulsion polymerization from tetraalkoxysilanes. However, there are two problems that are often associated with silicate shell encapsulants as delivery technology of actives in formulated products. First, silicate shell microcapsules often settle upon storing in suspension due to the increased density of the added shell material. Formulated products containing suspensions of the silicate shell microcapsules may be thickened to avoid settling of the microcapsules. However, formulation thickening often leads to transportation, application, and other formulation issues. Secondly, the current silicate shell microcapsules lack a temperature based release mechanism. Such release mechanisms are needed for certain applications such as in coatings or adhesives. Therefore, there remains a need for a silicate shell microcapsule compositions having a stabilized delivery system for temperature triggered release of actives that do not settle upon storing.

SUMMARY

The present inventors have discovered that when certain burst aids are added to the encapsulated active prior to encapsulation, stable compositions could be prepared that could also release said active within certain temperatures ranges. It was found that the level of burst aid could be regulated to essentially match the density of the external aqueous phase of the formulation which would also provides quick release of the actives at reduced temperatures, dependant on the vapor pressure of the burst aid.

The present disclosure provides an aqueous suspension of silicate shell microcapsules having a core containing a burst aid wherein the silicate shell microcapsules are obtained by;
I) mixing an oil phase containing a burst aid and an aqueous solution of a cationic surfactant to form an oil in water emulsion,
II) adding a water reactive silicon compound comprising a tetraalkoxysilane to the oil in water emulsion,
III) polymerizing the tetraalkoxysilane at the oil/water interface of the emulsion to form a microcapsule having a core containing the oil and a silicate shell.

DETAILED DESCRIPTION

The silicate shell microcapsules may be prepared by;
I) mixing an oil phase containing a burst aid and an aqueous solution of a cationic surfactant to form an oil in water emulsion,
II) adding a water reactive silicon compound comprising a tetraalkoxysilane to the oil in water emulsion,
III) polymerizing the tetraalkoxysilane at the oil/water interface of the emulsion to form a microcapsule having a core containing the oil and a silicate shell.

As used herein, "oil phase" encompasses any compound, or mixture of compounds that is hydrophobic. Typically, the oil phase is liquid when forming the oil in water emulsion. The oil phase may contain any organic, silicone, or fluorocarbon based oil, either alone or in combination. The oil phase may also contain any solvent or diluent, which may be added for the purpose of solubilizing solid hydrophobic compounds to create a liquid oil phase during formation of the emulsion.

As used herein, "burst aid" encompasses any compound, or mixture of compounds added to the oil phase for the purpose of initiating temperature controlled release of the encapsulated core material. The burst aids may be selected from volatile hydrophobic organic or siloxane compounds. Burst aids in this invention might be volatile linear hydrocarbons, including but not limited to, pentane, hexane, heptane, octane, nonane; volatile cyclic hydrocarbons such as cyclopentane, cyclohexane, cycloheptane, cyclooctane; volatile branched hydrocarbons such as isohexane, isoheptane, isooctane, isodecane, isododecane; volatile linear siloxanes, including but not limited to, hexamethyldisiloxane, decamethyltetrasiloxane; volatile cyclic siloxanes such as octamethylcyclotetrasiloxane, decamethylcyclopentasiloxane, dodecylmethylcyclohexasiloxane. Alternatively, the burst aid may be selected from those known in art as "blowing agents".

The amount of burst aid added to the oil phase, present in the microcapsules as a percentage of the oil phase weight prior to encapsulation, is between 0.1 and 50%, alternatively between 0.2 and 20%, or alternatively between 0.2 and 10%.

In one embodiment, the oil phase contains a sunscreen agent in addition to the burst aid. The sunscreen agents which are used in this embodiment can be liquid sunscreens and blends thereof. In the same embodiment of this invention solid organic sunscreens can be solubilised in a good solvent before encapsulation. Sunscreen agents in this invention might be for example DEA-methoxycinnamate, diethylhexylbutamido triazine, diisopropyl methyl cinnamate, 1-(3,4-dimethoxyphenyl)-4,4-dimethyl-1,3-pentanedione, drometrizole trisiloxane, benzophenone-3, benzophenone-4, 3-benzylidene camphor, 3-benzylidene camphor sulfonic acid, bis-ethylhexyloxyphenol methoxyphenyl triazine, butyl methoxydibenzoylmethane, camphor benzalkonium methosulfate, ethyl diisopropylcinnamate, 2-ethylhexyl dimethoxybenzylidene dioxoimidazolidine propionate, ethylhexyl dimethyl PABA, ethylhexyl salicilate, ethylhexyl triazone, ethyl PABA, homosalate, isoamyl p-methoxycinnamate, menthyl anthranilate, 4-methylbenzylidene camphor, methylene-bis-benzotriazolyl tetramethylbutylphenol, octocrylene, PABA, phenylbenzimidazole sulfonic acid, polyacrylamidomethyl benzylidene camphor, polysilicone-15, potassium phenylbenzimidazole sulfonate, sodium phenylbenzimidazole sulfonate, TEA-salicilate, terephtalidene dicamphor sulfonic acid, 2,2-(1,4-phenilene)bis-(1H-benzimidazole-4,6-disulfonic acid, 2-(4-diethylamine-2-hydroxy-benzoyl)-benzoic acid hexylester but is not limited to this list of UV absorber.

In another embodiment, the oil phase contains a hydrosilylation catalyst in addition to the burst aid. The hydrosilylation catalyst may be selected from any platinum group metal-containing catalysts. By platinum group it is meant ruthenium, rhodium, palladium, osmium, iridium and platinum and complexes thereof. Platinum group metal-containing catalysts are the platinum complexes prepared as described by Willing, U.S. Pat. No. 3,419,593, and Brown et al, U.S. Pat. No. 5,175,325, each of which is hereby incorporated by reference to show such complexes and their preparation. Other examples of useful platinum group metal-containing catalysts can be found in Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to show useful platinum group metal-containing catalysts and methods for their preparation. Preferred platinum-containing catalysts include chloroplatinic acid, either in hexahydrate form or anhydrous form, and or a platinum-containing catalyst which is obtained by a method comprising reacting chloroplatinic acid with an aliphatically unsaturated organosilicon compound such as divinyltetramethyldisiloxane, or alkene-platinum-silyl complexes, such as (COD)Pt(SiMeCl$_2$)$_2$, where COD is 1,5-cyclooctadiene and Me is methyl.

Other examples of active materials which may be used in the oil phase of the present process include UV absorbers used in coatings, paints, plastics materials, sealants or textile finishes for improving weatherability and resisting fading.

The oil phase may contain other components such as a silicone, organic, or personal care actives that are substantially soluble with the other oil phase components, and conversely, is substantially insoluble in water. Thus, other typical emollient components can include: silicones, such as volatile siloxanes, polydimethylsiloxane fluids, high molecular weight (i.e. $M_n$>1000) siloxanes, including silicone elastomers and resins; organic compounds such as, hydrocarbon oils, waxes, emollients, fragrances or perfume compositions; and personal care organic actives such as vitamins.

The oil phase is mixed with an aqueous solution of a cationic surfactant to form an oil in water emulsion.

Cationic surfactants useful in this invention might be quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, quaternary ammonium bases of benzimidazolines and polypropanolpolyethanol amines but is not limited to this list of cationic surfactants. A preferred cationic surfactant is cetyl trimethyl ammonium chloride.

For purposes of this invention, the cationic surfactant may be selected from an amphoteric surfactant such as cocamidopropyl betaine, cocamidopropyl hydroxysulfate, cocobetaine, sodium cocoamidoacetate, cocodimethyl betaine, N-coco-3-aminobutyric acid and imidazolinium carboxyl compounds but is not limited to this list of amphoteric surfactants.

The above surfactants may be used individually or in combination. The cationic or amphoteric surfactant is dissolved in water and the resulting aqueous solution used as a component in aqueous or continuous phase of the oil in water emulsion of step I).

Although not wishing to be bound by any theory, the present inventors believe the use of a cationic or amphoteric surfactant promotes condensation and polymerisation of the tetraalkoxysilane at the interface of the emulsified droplets of the sunscreen agent composition, leading to non-diffusive microcapsules. The tetraalkoxysilane hydrolyzes and condenses upon reacting in the emulsion. The anionically charged hydrolysis product is attracted to the cationic or amphoteric surfactant at the interface where it forms the silicon based polymer shell.

The concentration of the cationic surfactant during the formation of the oil in water emulsion should be between 0.1% and 0.3% by weight of the oil phase concentration used. We have found that the use of low levels of cationic or amphoteric surfactant during emulsification of the oil phase and reaction with the alkoxysilane leads to microcapsules which are more resistant to diffusion or leaching of the oil phase from the microcapsules.

Auxiliary surfactants, and in particular nonionic surfactants, may be added during the formation of the oil in water emulsion. Suitable non-ionic surfactants are; polyoxyalkylene alkyl ethers such as polyethylene glycol long chain (12-14C) alkyl ether, polyoxyalkylene sorbitan ethers, polyoxyalkylene alkoxylate esters, polyoxyalkylene alkylphenol ethers, ethylene glycol propylene glycol copolymers, polyvinyl alcohol and alkylpolysaccharides, for example materials of the structure R$^1$—O—(R$^2$O)$_m$-(G)$_n$ wherein R$^1$ represents a linear or branched alkyl group, a linear or branched alkenyl group or an alkylphenyl group, R$^2$ represent an alkylene group, G represents a reduced sugar, m denotes 0 or a positive integer and n represent a positive integer as described in U.S. Pat. No. 5,035,832 but is not limited to this list of non-ionic surfactants.

The aqueous solution of the cationic or amphoteric surfactant may contain additional/optional components, providing they are water soluble. For example a water-miscible organic solvent such as an alcohol or lactam may be added. Furthermore, other water soluble ingredients that are commonly used in personal care formulations may be added to the aqueous phase. Such ingredients include additional surfactants, thickeners, preservatives, antimicrobial, and water soluble actives and fragrances.

The oil phase and aqueous solution of the cationic or amphoteric surfactant are mixed together to form an oil in water emulsion. Mixing and emulsion formation may occur using any known techniques in the emulsion art. Typically, the oil phase and aqueous solution of the cationic or amphoteric surfactant are combined using simple stirring techniques to form an emulsion. Particle size of the oil in water emulsion may then be reduced before addition of the tetraalkoxysilane by any of the known in the art emulsification device. Useful emulsification devices in this invention can be homogenizer, sonolator, rotor-stator turbines, colloid mill, microfluidizer, blades, helix and combination thereof but is not limited to this list of emulsification devices. This further processing step reduces the particle size of the starting cationic oil in water emulsion to values ranging from 0.2 to 500 micrometers, with typical particle sizes ranging between 0.5 micrometers and 100 micrometers.

The weight ratio of oil phase to aqueous phase in the emulsion can generally be between 40:1 and 1:50, although the higher proportions of aqueous phase are economically disadvantageous particularly when forming a suspension of microcapsules. Usually the weight ratio of oil phase to aqueous phase is between 2:1 and 1:3. If the oil phase composition is highly viscous, a phase inversion process can be used in which the oil phase is mixed with surfactant and a small amount of water, for example 2.5 to 10% by weight based on the oil phase, forming a water-in-oil emulsion which inverts to an oil-in-water emulsion as it is sheared. Further water can then be added to dilute the emulsion to the required concentration.

In one embodiment, the density of the oil phase to the aqueous phase in the emulsion is approximately the same, that is the densities are "matched", alternatively the densities of each are within 2%, alternatively 1%, or alternatively within 0.5%

The second and third steps of the present process involve adding a water reactive silicon compound comprising tetraalkoxysilane to the oil in water emulsion, and polymerizing the tetraalkoxysilane at the oil/water interface of the emulsion. Although not wishing to be bound by any theory, the present inventors believe the third step effects an "ex-situ emulsion polymerization" by which the tetraalkoxysilane precursor hydrolyzes and condenses at the oil/water interface leading to the formation of core-shell microcapsules via a phase transfer of the precursors.

The tetraalkoxysilane, such as tetraethoxysilane (TEOS), can be used in monomeric form or as a liquid partial condensate. The tetraalkoxysilane can be used in conjunction with one or more other water-reactive silicon compound having at least two, preferably at least 3, Si—OH groups or hydrolysable groups bonded to silicon, for example an alkyltrialkoxysilane such as methyltrimethoxysilane or a liquid condensate of an alkyltrialkoxysilane. Hydrolysable groups can for example be alkoxy or acyloxy groups bonded to silicon. The water reactive silicon compound can for example comprise 75-100% by weight tetraalkoxysilane and 0-25% trialkoxysilane. The alkyl and alkoxy groups in the tetraalkoxysilanes or other silanes preferably contain 1 to 4 carbon atoms, most preferably 1 or 2 carbon atoms. The tetraalkoxysilane, and other water-reactive silicon compound if used, hydrolyses and condenses to form a network polymer, that is a 3-dimensional network of silicon-based material, around the emulsified droplets of the lipophilic active material composition. The water-reactive silicon compound preferably consists of at least 75%, and most preferably 90-100% tetraalkoxysilane. We have found that a tetraalkoxysilane effectively forms impermeable microcapsules, forming a 3-dimensional network consisting substantially of $SiO_{4/2}$ units.

The tetraalkoxysilane, and other water reactive silicon compounds if used, can be added to the emulsion of active material composition as an undiluted liquid or as a solution in an organic solvent or in an emulsion form. The tetraalkoxysilane and the oil in water emulsion are mixed during addition and subsequent polymerization to form the silicon-based polymer shell on the surface of the emulsified droplets. Mixing is typically effected with stirring techniques. Common stirring techniques are typically sufficient to maintain the particle size of the starting oil in water emulsion while allowing the tetraalkoxysilane to polymerize and condense at the oil water interface The amount of tetraalkoxysilane added in step II typically ranges from 6/1 to 1/13, alternatively from 1.2/1 to 1/7.3, alternatively from 1.3 to 1/6.1 based on the weight amount of oil phase present in the emulsion.

The polymerization of the tetraalkoxysilane at the oil/water interface typically is a condensation reaction which may be conducted at acidic, neutral or basic pH. The condensation reaction is generally carried out at ambient temperature and pressure, but can be carried out at increased temperature, for example up to 95° C., and increased or decreased pressure, for example under vacuum to strip the volatile alcohol produced during the condensation reaction.

Any catalyst known to promote the polymerization of the tetraalkoxysilane may be added to step III to form the shell of the microcapsule. The catalyst is preferably an oil soluble organic metal compound, for example an organic tin compound, particularly an organotin compound such as a diorganotin diester, for example dimethyl tin di(neodecanoate), dibutyl tin dilaurate or dibutyl tin diacetate, or alternatively a tin carboxylate such as stannous octoate, or an organic titanium compound such as tetrabutyl titanate. An organotin catalyst can for example be used at 0.05 to 2% by weight based on the water reactive silicon compound. An organotin catalyst has the advantage of effective catalysis at neutral pH. The catalyst is typically mixed with the oil phase components before it is emulsified, since this promotes condensation of the water reactive silicon compound at the surface of the emulsified oil phase droplets. A catalyst can alternatively be added to the emulsion before the addition of the water-reactive silicon compound, or simultaneously with the tetraalkoxysilane, or after the addition of the tetraalkoxysilane to harden and make more impervious the shell of silicon-based polymer which has been formed. Encapsulation can however be achieved without catalyst. The catalyst, when used, can be added undiluted, or as a solution in an organic solvent such as a hydrocarbon, alcohol or ketone, or as a mutiphasic system such as an emulsion or suspension.

In one embodiment, the polymerization reaction in step III) is allowed to proceed so as to form the shell of a microcapsule that is at least 18 nanometers thick, alternatively the shell has a thickness in the range of 18 to 150 nanometers, alternatively from 18 to 100 nanometers.

Shell thicknesses may be determined from the particle size (PS) of the resulting microcapsules in suspension and the amounts of the oil phase and tetraalkoxysilane used in the process to prepare them according to the following:

$$\text{Shell Thickness (nm)} = [(PS/2) - [(PS/2)*(\text{Payload}/100)^{1/3}]] * 1000$$

where PS is particle size (Dv 0.5) expressed in micrometers
payload=Volume oil phase *100/(Volume oil phase+Volume shell)
Volume oil phase=Mass oil phase/density of oil phase
Volume shell=Mass shell/density of the shell This equation is based on the spherically shaped microcapsules having an average diameter as determined by their average particle size (Dv 0.5). Thus, the shell thickness is the difference between the radius of the microcapsule and the radius of the core material in the microcapsule.

$$\text{Shell thickness} = r_{microcapsule} - r_{core}$$

where $r_{microcapsule} = (PS)/2$
and $r_{core} = (PS/2)*(\text{Payload}/100)^{1/3}$)

Payload represents the percentage of the microcapsule occupied by the core material, as determined by the amount of oil phase present in the emulsion. Thus, payload is calculated by the relationship;

$$\text{Payload} = \text{Volume oil phase}*100/(\text{Volume oil phase} + \text{Volume shell})$$

The volume oil phase=mass oil phase/density of oil phase. The mass of the oil phase in this equation is the same as the amount used in the process (as per step I) to prepare the microcapsules. In one embodiment of the present invention, the oil phase is ethylhexy methoxycinnamate (EHMC) having a density of 1.011 g/mL.

The volume of the shell=mass of shell/density of silica. The silicon based polymer comprising the shell is expected to have an average chemical composition with the empirical formula $SiO_2$. Thus, the density of the shell is estimated to be 2 g/mL, which approximates the density of silica ($SiO_2$). The mass of the shell is calculated from the amount of tetraalkoxysilane added to the process (as per step II). More specifically, the mass of the shell is based on the expected stoichiometric yield of silicon based polymer of empirical formula $SiO_2$ given the type and amount of the tetraalkoxysilane used in the process. In one embodiment, the tetraalkoxysilane is tetraethoxysilane (TEOS) having a density of 0.934 g/mL. In this embodiment, the assumed complete hydrolysis and condensation of 1 g of TEOS produces 0.288 g of $SiO_2$ polymer (silica).

Although not wishing to be bound by any theory, the present inventors believe the improved suspension stability is imparted to the silicate shell microcapsule by absorbing collision energy during normal Brownian motion and from the burst aid in reducing the density of the microcapsule to more closely match that of the aqueous continuous phase.

The present disclosure provides further a method for releasing an active from silicate shell microcapsules comprising:
i) preparing silicate shell microcapsules having a core containing a burst aid,
ii) sufficiently heating the silicate shell microcapsules to volatilize the burst aid.

In the above method, the silicate shell microcapsules may be prepared according to any of the techniques described above. Once prepared, the microcapsules, or suspension of microcapsules, are sufficiently heated to cause an increase in the vapor pressure of the burst aid, which subsequently ruptures the silicate shell to release the active material contained in the core. The amount of heat necessary will vary depending on the choice of the burst aid and thickness of the silicate shell, as described below.

The microcapsules according to the invention inhibit diffusion or leaching of the lipophilic cosmetic, chemical, biological or pharmaceutical active material from the microcapsules. When encapsulating catalyst, for example, it is preferred that the rate of diffusion or leaching is as low as possible. For other lipophilic active materials a controlled rate of release may be preferred, and this can be achieved by adjusting the level of surfactant, the level of tetraalkoxysilane, and the particle size (shell thickness).

In evaluating the microcapsule suspensions, the suspension stabilization is determined by the amount of separation as measured as a percentage of the total suspension height over a six months timeframe. The active triggered release temperature is determined by a headspace GC/MS analysis of the suspension tracking the presence of burst aid with increasing temperature.

Particle size measurements here specified are made by laser diffraction technique using a "Mastersizer S" from Malvern Instruments Ltd., UK, and further information on the above particle sizes can e.g. be found in "*Basic principles of particle size analytics*", Dr. Alan Rawle, Malvern Instruments Limited, WR14 1XZ, UK and the "Manual of Malvern Mastersizer S particle size analyzer". All particle sizes indicated in the present application are mean average particle size according to D(v, 0.5) and are measured with a Malvern Mastersizer S, if nothing else is stated or obvious.

EXAMPLES

These examples are intended to illustrate the invention to one of ordinary skill in the art and should not be interpreted as limiting the scope of the invention set forth in the claims. All measurements and experiments were conducted at 23° C., unless indicated otherwise.

Example 1

260.46 g of water is pre-mixed with 1.6 g of ARQUAD 16-29 (29 wt % cetyltrimethylammonium chloride) and 0.64 g of Laureth 3. 17.50 g of heptane is blended with 157.5 g ethylhexyl methoxy cinnamate and slowly added to the water/surfactant premix with stirring. The mixture is then emulsified with an APV 2000 homogenizer at 700 psi to get the corresponding fine emulsion. 10.46% TEOS is added to the emulsion while stirring to form a coarse emulsion of microcapsules. Microcapsules of average volume particle size (Dv 0.5) 1.11 micrometers (μm) were produced in suspension.

Example 2 (Comparative)

270.45 g of water is pre-mixed with 1.59 g of ARQUAD 16-29 and 0.64 g of Laureth 3. 175.0 g ethylhexyl methoxy cinnamate is slowly added to the water/surfactant premix with stirring. The mixture is then emulsified with an APV 2000 homogenizer at 700 psi to get the corresponding fine emulsion. 10.46% TEOS is added to the emulsion while stirring to form a coarse emulsion of microcapsules. Microcapsules of average volume particle size (Dv 0.5) 2.15 micrometers (μm) were produced in suspension.

Example 3

260.44 g of water is pre-mixed with 1.6 g of ARQUAD 16-29 and 0.65 g of Laureth 3. 17.5 g of octane is blended with 157.5 g ethylhexyl methoxy cinnamate and slowly added to the water/surfactant premix with stirring. The mixture is then emulsified with an APV 2000 homogenizer at 700 psi to get the corresponding fine emulsion. 10.46% TEOS is added to the emulsion while stirring to form a coarse emulsion of microcapsules. Microcapsules of average volume particle size (Dv 0.5) 1.15 micrometers (μm) were produced in suspension.

Example 4

260.45 g of water is pre-mixed with 1.59 g of ARQUAD 16-29 and 0.65 g of Laureth 3. 17.5 g of hexamethyldisiloxane (Dow Corning® 0.65 cst 200 Fluid) is blended with 157.5 g ethylhexyl methoxy cinnamate and slowly added to the water/surfactant premix with stirring. The mixture is then emulsified with an APV 2000 homogenizer at 700 psi to get the corresponding fine emulsion. 10.46% TEOS is added to the emulsion while stirring to form a coarse emulsion of microcapsules. Microcapsules of average volume particle size (Dv 0.5) 1.05 micrometers (μm) were produced in suspension.

Example 5

520.89 g of water is pre-mixed with 3.22 g of ARQUAD 16-29 and 1.31 g of Laureth 3. 35.0 g of decamethytetrasiloxane (Dow Corning® 1.5 cst. 200 Fluid) is blended with 315.0 g ethylhexyl methoxy cinnamate and slowly added to the water/surfactant premix with stirring. The mixture is then emulsified with an APV 2000 homogenizer at 700 psi to get the corresponding fine emulsion. 10.46% TEOS is added to the emulsion while stirring to form a coarse emulsion of microcapsules. Microcapsules of average volume particle size (Dv 0.5) 1.12 micrometers (μm) were produced in suspension.

Example 6

270.46 g of water is pre-mixed with 1.61 g of ARQUAD 16-29 and 0.65 g of Laureth 3. 5.23 g of octamethyltetracyclosiloxane (Dow Corning® 244 Fluid) is blended with 170.01 g ethylhexyl methoxy cinnamate and slowly added to the water/surfactant premix with stirring. The mixture is then emulsified with an APV 2000 homogenizer at 700 psi to get the corresponding fine emulsion. 10.46% TEOS is added to the emulsion while stirring to form a coarse emulsion of microcapsules. Microcapsules of average volume particle size (Dv 0.5) 1.10 micrometers (μm) were produced in suspension.

Example 7

270.44 g of water is pre-mixed with 1.61 g of ARQUAD 16-29 and 0.72 g of Laureth 3. 5.09 g of decamethylpentacyclosiloxane (Dow Corning® 245 Fluid) is blended with 170.00 g ethylhexyl methoxy cinnamate and slowly added to the water/surfactant premix with stirring. The mixture is then emulsified with an APV 2000 homogenizer at 700 psi to get the corresponding fine emulsion. 10.46% TEOS is added to the emulsion while stirring to form a coarse emulsion of microcapsules. Microcapsules of average volume particle size (Dv 0.5) 1.13 micrometers (μm) were produced in suspension.

Example 8

270.45 g of water is pre-mixed with 1.60 g of ARQUAD 16-29 and 0.66 g of Laureth 3. 5.06 g of dodecamethylhexacyclosiloxane (Dow Corning® 246 Fluid) is blended with 170.00 g ethylhexyl methoxy cinnamate and slowly added to the water/surfactant premix with stirring. The mixture is then emulsified with an APV 2000 homogenizer at 700 psi to get the corresponding fine emulsion. 10.46% TEOS is added to the emulsion while stirring to form a coarse emulsion of microcapsules. Microcapsules of average volume particle size (Dv 0.5) 1.09 micrometers (μm) were produced in suspension.

Example 9

270.46 g of water is pre-mixed with 1.61 g of ARQUAD 16-29 and 0.64 g of Laureth 3. 5.1 g of octane is blended with 170.0 g ethylhexyl methoxy cinnamate and slowly added to the water/surfactant premix with stirring. The mixture is then emulsified with an APV 2000 homogenizer at 700 psi to get the corresponding fine emulsion. 10.46% TEOS is added to the emulsion while stirring to form a coarse emulsion of microcapsules. Microcapsules of average volume particle size (Dv 0.5) 1.09 micrometers (μm) were produced in suspension.

Example 10

199.51 g of water is pre-mixed with 2.99 g of ARQUAD 16-29 and 2.99 g of Laureth 3. 1.51 g of octane is blended with 90.0 g Dow Corning Syloff® 4000 (Pt complexed with Vinyl Siloxane) and slowly added to the water/surfactant premix with stirring. The mixture is then emulsified with an APV 2000 homogenizer at 15,000 psi to get the corresponding fine emulsion. 1.0% TEOS is added to the emulsion while stirring to form a coarse emulsion of microcapsules. Microcapsules of average volume particle size (Dv 0.5) 0.245 micrometers (μm) were produced in suspension.

Table 1 below summarizes the pertinent data obtained with regard to suspension stabilization and active release for the examples cited as part of this invention.

TABLE 1

| Example # | Active Ingredient | % of Active Ingredient | Burst Aid | % of Burst Aid | Vapor Pressure of Burst Aid (torr at 25 C.) | Density of Burst Aid | % of Sample Separation (Settling) in 6 months at RT | Temperature Range of Active Release via Headspace GC/MS |
|---|---|---|---|---|---|---|---|---|
| 1 | ethylhexylmethoxy-cinnamate | 31.5 | Heptane | 3.5 | 51.75 | 0.684 | 0 | 40-55° C. |
| 2 | ethylhexylmethoxy-cinnamate | 35.0 | N/A | 0 |  | N/A | 47.8 | 170-235° C. |
| 3 | ethylhexylmethoxy-cinnamate | 31.5 | Octane | 3.5 | 13.65 | 0.703 | 8.2 | 40-60° C. |
| 4 | ethylhexylmethoxy-cinnamate | 31.5 | Hexamethyldisiloxane | 3.5 | 37.1 | 0.764 | 29.6 | 40-60° C. |
| 5 | ethylhexylmethoxy-cinnamate | 31.5 | Decamethyltetrasiloxane | 3.5 | 0.5 | 0.854 | 7.8 | 40-100° C. |
| 6 | ethylhexylmethoxy-cinnamate | 34.0 | Octamethylcyclotetra-siloxane | 1.0 | 1.7 | 0.956 | 17.2 | 60-90° C. |
| 7 | ethylhexylmethoxy-cinnamate | 34.0 | Decamethylcyclopenta-siloxane | 1.0 | 0.1 | 0.958 | 18.6 | 60-95° C. |
| 8 | ethylhexylmethoxy-cinnamate | 34.0 | Dodecamethylcyclohexa-siloxane | 1.0 | 0.01 | 0.961 | 15.6 | 75-130° C. |
| 9 | ethylhexylmethoxy-cinnamate | 34.0 | Octane | 1.0 | 13.65 | 0.703 | 6 | 55-70° C. |
| 10 | Syloff ® 4000 - Pt catalyst | 34.5 | Octane | 0.5 | 13.65 | 0.703 | 3.1 | 60-70° C. |

The invention claimed is:
1. An aqueous suspension of silicate shell microcapsules, wherein the suspension contains:
   microcapsules containing an oil phase and a burst aid that is a volatile hydrophobic hydrocarbon between 0.2 and 20 weight % of the oil phase, and having a silicate shell formed by polymerizing a water reactive silicon compound comprising a tetraalkoxysilane; and a water phase containing an aqueous solution of a cationic surfactant to form an oil in water emulsion, wherein the density of the oil phase and the density of the water phase of the oil in water emulsion are within 2% of each other;

wherein the microcapsules are configured such that the silicate shells rupture at a trigger temperature from 40° C. to 100° C. via volatilization of the burst aid.

2. The aqueous suspension of claim 1, wherein the volatile hydrophobic hydrocarbon is selected from the group consisting of pentane, hexane, heptane, octane, nonane, cyclopentane, cyclohexane, cycloheptane, cyclooctane, isohexane, isoheptane, isooctane, isodecane, isododecane, and mixtures thereof.

3. An aqueous suspension of silicate shell microcapsules, wherein the suspension contains:

microcapsules having a core containing an oil phase and a burst aid between 0.2 and 20 weight % of the oil phase, and a silicate shell formed by polymerizing a water reactive silicon compound comprising a tetraalkoxysilane; and a water phase;

wherein the microcapsules are configured such that the silicate shells rupture at a trigger temperature from 40° C. to 100° C. via volatilization of the burst aid.

4. The aqueous suspension of claim 3, wherein the oil phase further contains a hydrosilylation catalyst.

5. The aqueous suspension of claim 4, wherein the hydrosilylation catalyst is a platinum group metal-containing catalyst.

6. The aqueous suspension of claim 3, wherein the burst aid is a volatile siloxane.

7. The aqueous suspension of claim 6, wherein the volatile siloxane is selected from the group consisting of hexamethyldisiloxane, decamethyltetrasiloxane, octamethylcyclotetrasiloxane, decamethylcyclopentasiloxane, dodecylmethylcyclohexasiloxane, and mixtures thereof.

8. The aqueous suspension of claim 3, wherein the density of the oil phase and the density of the water phase of the oil in water emulsion are approximately the same.

9. The aqueous suspension of claim 3, wherein the oil phase further contains a sunscreen.

10. The aqueous suspension of claim 3, wherein the silicate shell has a thickness of from 18 to 150 nanometers.

11. The aqueous suspension of claim 1, wherein the silicate shell has a thickness of from 18 to 150 nanometers.

12. An aqueous suspension of silicate shell microcapsules, wherein the suspension contains:

microcapsules having a core containing an oil phase, a burst aid that is a volatile siloxane between 0.2 and 20 weight % of the oil phase, and a hydrosilylation catalyst, and having a silicate shell formed by polymerizing a water reactive silicon compound comprising a tetraalkoxysilane; and a water phase;

wherein the microcapsules are configured such that the silicate shells rupture at a trigger temperature from 40° C. to 100° C. via volatilization of the burst aid.

13. The aqueous suspension of claim 12, wherein the volatile siloxane is selected from the group consisting of hexamethyldisiloxane, decamethyltetrasiloxane, octamethylcyclotetrasiloxane, decamethylcyclopentasiloxane, dodecylmethylcyclohexasiloxane, and mixtures thereof.

14. The aqueous suspension of claim 13, wherein the hydrosilylation catalyst is a platinum group metal-containing catalyst.

15. The aqueous suspension of claim 14, wherein the density of the oil phase and the density of the water phase of the oil in water emulsion are approximately the same.

16. The aqueous suspension of claim 15, wherein the silicate shell has a thickness of from 18 to 150 nanometers.

17. The aqueous suspension of claim 12, wherein the hydrosilylation catalyst is a platinum group metal-containing catalyst.

18. The aqueous suspension of claim 17, wherein the density of the oil phase and the density of the water phase of the oil in water emulsion are approximately the same.

19. The aqueous suspension of claim 12, wherein the density of the oil phase and the density of the water phase of the oil in water emulsion are approximately the same.

20. The aqueous suspension of claim 12, wherein the silicate shell has a thickness of from 18 to 150 nanometers.

21. The aqueous suspension of claim 3, wherein the silicate shell microcapsules are configured to rupture after volatilization of the burst aid based on a combination of burst aid type, burst aid amount, and thickness of the silicate shell.

22. A process for preparing the aqueous suspension of silicate shell microcapsules as set forth in claim 3, wherein the process comprises:

I) mixing an oil phase containing a burst aid that is a volatile hydrophobic hydrocarbon or a volatile siloxane with an aqueous solution of a cationic surfactant to form an oil in water emulsion, wherein the burst aid is between 0.2 and 20 weight % of the oil phase and the density of the oil phase and the density of the water phase of the oil in water emulsion are within 2% of each other;

II) adding a water reactive silicon compound comprising a tetraalkoxysilane to the oil in water emulsion; and III) polymerizing the tetraalkoxysilane at the oil/water interface of the oil in water emulsion to form a microcapsule having a core containing the oil phase and a silicate shell.

23. The process of claim 22, wherein ihe oil phase further contains a hydrosilylation catalyst.

24. A process for releasing an active from the silicate shell microcapsules as set forth in claim 3, wherein the process comprises:

i) preparing silicate shell microcapsules having a core containing a burst aid and an active: and ii) sufficiently heating the silicate shell microcapsules to volatilize the burst aid and release the active from the silicate shell microcapsules.

25. The process of claim 24, wherein the active comprises a hydrosilylation catalyst.

\* \* \* \* \*